(12) United States Patent
Galbiati (10) Patent No.: US 12,355,385 B2
(45) Date of Patent: Jul. 8, 2025

(54) METHOD OF OPERATING A HARD DISK DRIVE, CORRESPONDING CONTROLLER, HARD DISK DRIVE AND PROCESSING DEVICE

(71) Applicant: STMicroelectronics S.r.l., Agrate Brianza (IT)

(72) Inventor: Ezio Galbiati, Agnadello (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 170 days.

(21) Appl. No.: 18/176,778

(22) Filed: Mar. 1, 2023

(65) Prior Publication Data
US 2023/0318493 A1   Oct. 5, 2023

(30) Foreign Application Priority Data
Apr. 1, 2022   (IT) .................. 102022000006467

(51) Int. Cl.
| | | |
|---|---|---|
| *H02K 7/10* | (2006.01) | |
| *H02P 3/18* | (2006.01) | |
| *H02P 23/14* | (2006.01) | |

(52) U.S. Cl.
CPC ................ *H02P 3/18* (2013.01); *H02P 23/14* (2013.01)

(58) Field of Classification Search
CPC .... H02P 3/18; H02P 23/14; H02P 6/24; H02P 25/034; H02P 27/08; H02P 6/08
See application file for complete search history.

(56) References Cited

U.S. PATENT DOCUMENTS

| | | | |
|---|---|---|---|
| 5,838,515 A | * | 11/1998 | Mortazavi ............. H02P 25/034 360/78.12 |
| 6,542,324 B1 | | 4/2003 | Galbiati et al. |
| 7,466,095 B1 | | 12/2008 | Chui |
| 2015/0036238 A1 | | 2/2015 | Ferrario et al. |

FOREIGN PATENT DOCUMENTS

| | | | |
|---|---|---|---|
| EP | 1118994 A2 | 7/2001 | |
| WO | WO-2009147601 A1 | * 12/2009 | ......... H05B 33/0815 |

* cited by examiner

*Primary Examiner* — Karen Masih
(74) *Attorney, Agent, or Firm* — Slater Matsil, LLP (57) ABSTRACT

In accordance with an embodiment a method includes: receiving a slow down command to slow down a speed of a voice coil motor (VCM) in a hard disk drive; in response to receiving the slow down command, operating the VCM in a discontinuous mode by switching on and off a current through the VCM with a duty-cycle, wherein operating the VCM in the discontinuous mode reduces the speed of the VCM; sensing the speed of the VCM while operating the VCM in the discontinuous mode; and varying the duty-cycle of the switching on and off the current through the VCM as a function of the sensed speed of the VCM operated in the discontinuous mode, wherein varying the duty-cycle comprises reducing the duty-cycle in response to a reduction of the sensed VCM speed.

23 Claims, 8 Drawing Sheets

METHOD OF OPERATING A HARD DISK DRIVE, CORRESPONDING CONTROLLER, HARD DISK DRIVE AND PROCESSING DEVICE

CROSS-REFERENCE TO RELATED APPLICATIONS

This application claims the benefit of Italian Patent Application No. 102022000006467, filed on Apr. 1, 2022, which application is hereby incorporated herein by reference.

TECHNICAL FIELD

Embodiments of the present invention may be directed to a method of operating a hard disk drive, a corresponding controller, a hard disk drive, and a processing device.

BACKGROUND

The designation voice coil motor or VCM is currently used to designate linear motors used to move the heads in hard disk drives (HDDs).

Adequate performance in terms of braking time and speed recovery (for instance when head retract is commanded just after a fast seek) is a desirable feature of a VCM. Braking a VCM may involve a discontinuous mode where the current through the VCM is alternately switched on and off so that the average VCM current is affected by the duty-cycle (that is, the ratio of the "on" time to the sum of the "on" and "off" times) selected for such switching action.

This does not represent a big issue for speed control in normal operation. However, the operating duty-cycle may limit the braking capability in case the VCM is desired to be slowed down quickly.

The operating duty-cycle is usually a user-selectable parameter and the user can also specify a different duty-cycle during normal speed control and during the initial brake phase, for instance if a fast seek is commanded before the heads retract.

In conventional arrangements, once selected, the operating duty-cycle remains fixed during the whole braking (retract) procedure. It is noted that fixed duty-cycle operation in a discontinuous mode is disadvantageous: due to the lower braking capability, the user is led to limit the maximum seek speed, which ultimately results in slowing down the HDD data transfer rate.

SUMMARY

One or more embodiments relate to a corresponding controller.

One or more embodiments relate to a corresponding hard disk drive.

One or more embodiments relate to a corresponding processing device. A computer, a server, or data center equipped with a hard disk drive are exemplary of such a device.

Essentially, examples as presented herein provide for self-adjustment of the operating duty-cycle according to the VCM speed: the higher the speed, the higher the operating duty-cycle, according to a monotonic relationship between decreasing values of the sensed VCM speed and decreasing values of the duty-cycle applied to turning on and off the current through the VCM.

Examples as presented herein provide the capability of slowing down VCM speed to a safe level after a fast seek, before the VCM arms may hit the parking ramp or the inner crash stop.

A variable duty-cycle as used in examples as discussed herein may manifest via a VCM output differential voltage and/or VCM current observed when performing head retract (at power good and at power off). In order to control VCM speed, the VCM power stage (also) is controlled in a discontinuous mode: the current through the VCM is periodically interrupted to facilitate reading the VCM back electromotive force (BEMF) generated in response to motion.

BRIEF DESCRIPTION OF THE DRAWINGS

One or more embodiments will now be described, by way of example only, with reference to the annexed figures, wherein.

Corresponding numerals and symbols in the different figures generally refer to corresponding parts unless otherwise indicated. The figures are drawn to clearly illustrate the relevant aspects of the embodiments and are not necessarily drawn to scale. The edges of features drawn in the figures do not necessarily indicate the termination of the extent of the feature. Also, for the sake of simplicity and ease of explanation a same designation may be applied throughout this description to designate a circuit node or line as well as a signal occurring at that node or line.

DETAILED DESCRIPTION OF ILLUSTRATIVE EMBODIMENTS

In the ensuing description, various specific details are illustrated in order to provide an in-depth understanding of various examples of embodiments according to the description. The embodiments may be obtained without one or more of the specific details, or with other methods, components, materials, etc. In other cases, known structures, materials, or operations are not illustrated or described in detail so that various aspects of the embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment", "in one embodiment", or the like, that may be present in various points of the present description do not necessarily refer exactly to the same embodiment. Furthermore, particular configurations, structures, or characteristics may be combined in any adequate way in one or more embodiments.

The headings/references used herein are provided merely for convenience and hence do not define the extent of protection or the scope of the embodiments.

Some embodiments of the present invention may relate to hard disk drives and may be applied, for instance, to hard disk drives used in processing devices such as computers, servers, data centers and the like.

As discussed in the introductory portion of this description, HDD is an acronym for Hard Disk Drive. Also, the designation voice coil motor or VCM is currently used to designate linear motors used to move the heads in hard disk drives. A hard disk drive is a basic component of various types of processing devices such as personal computers, servers, data centers or the like and is the physical location where information is stored.

Examples as discussed herein facilitate a VCM brake procedure for recovering and adequate VCM speed value before the heads retract with constant speed.

Examples as discussed herein aim at improving speed recovery performance of a voice coil motor or VCM, in terms of braking time, for instance in case head retract is commanded just after a fast seek.

Reducing as fast as possible voice coil motor speed is desirable in order to avoid hitting the parking ramp or the inner crash stop at a high speed. If the ramp or the inner crash stop is hit upon at a speed higher than an upper tolerated speed, HDD reliability will be penalized. Known conventional procedures for that purpose exhibit limitations in terms of braking efficiency.

When performing an (e.g., emergency) retract at constant speed, the VCM can be driven in a discontinuous mode, where the VCM alternates a driving phase and a tri-state phase. The driving phase is used to generate torque moving the heads to the parking position, and the tri-state phase is used to monitor the VCM back electromotive force (BEMF) in order to control the parking speed.

In these known solutions, the current through the VCM is driven with a fixed duty-cycle during a selected driving phase (Ton) and a selected tristate phase (Toff). Based on the Ton and Toff times, the operating duty-cycle defines the VCM average current as well as the BEMF sampling time (e.g., in a range around 1 msec).

For instance, if a fast speed recovery phase occurs before a head retract operation, the braking current supplied to the VCM will be limited by the selected duty-cycle. The VCM average current will be lower than the total amount notionally available. The brake time will be longer, with the risk of hitting the parking ramp at a speed above a maximum tolerated value. U.S. Pat. No. 6,542,324 B1 is exemplary of such an approach in VCM speed control in a discontinuous mode as used in emergency retract at power off.

To summarize, a discontinuous mode with a driving phase (to generate driving/braking torque to the VCM) and a tristate phase (to detect the VCM BEMF) may be commanded in order to control parking of the heads of an HDD at constant speed). A user can select the associated operating duty-cycle and can also differentiate the duty-cycle during normal speed control and during an initial brake phase, for instance if a fast seek was commanded before the heads retract. Once selected, the operating duty-cycle remains fixed during the whole of the retract procedure.

The examples presented herein provide improvements in term of maximum operating duty-cycle, with the possibility to drive a higher average current in order to decrease the VCM speed in a shorter time.

Figure 1:
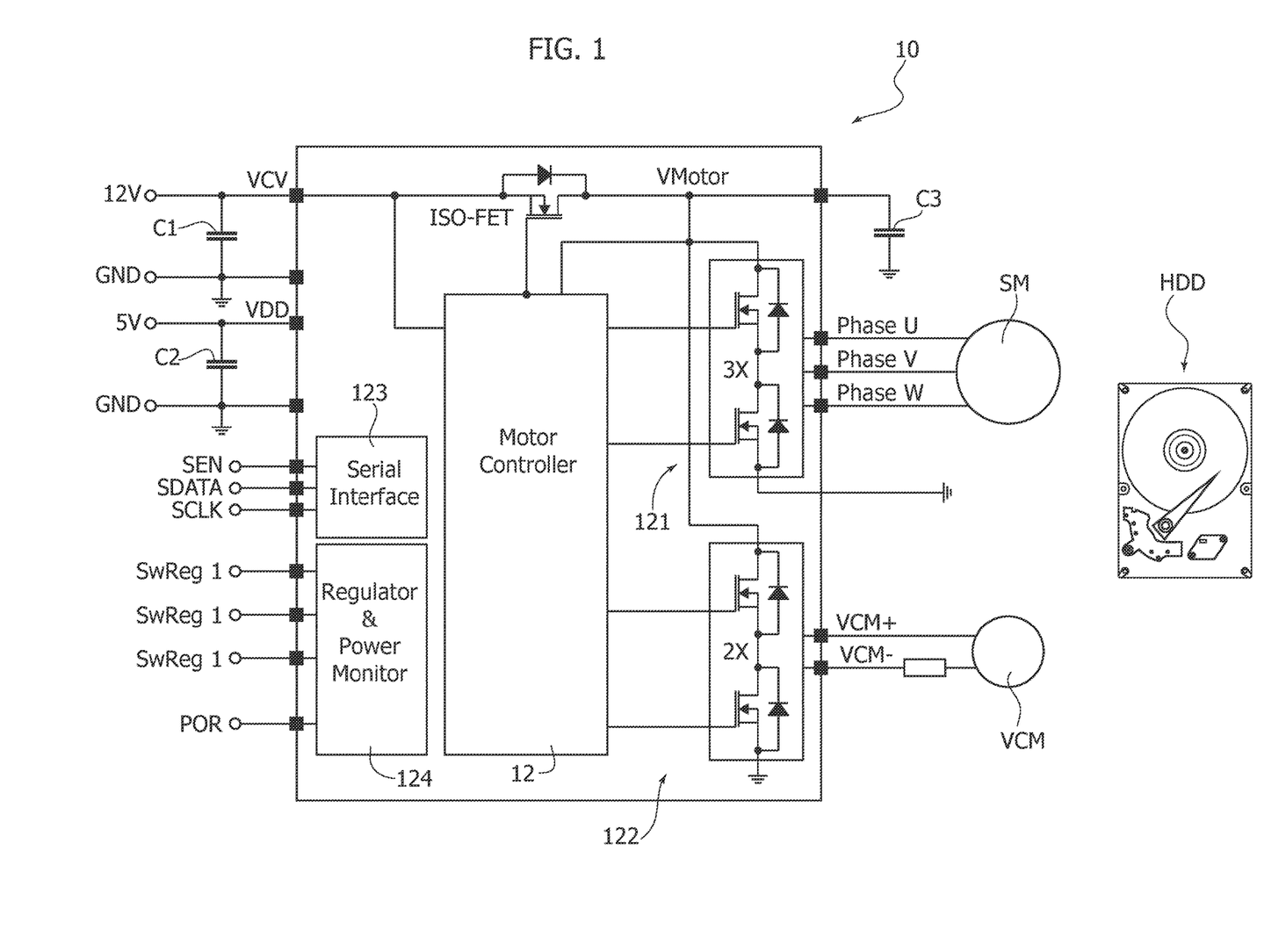
FIG. 1 is a block diagram of a power control circuitry ("combo") used in a hard disk application.

FIG. 1 is a block diagram of a circuit 10 configured to control a spindle motor SM and a VCM in a hard disk drive HDD. Briefly, the circuit 10 is built around a spindle and VCM motor controller 12 configured to drive the spindle motor SM via a spindle power stage 121, and the VCM via a VCM power stage 122.

References 123 and 124 in FIG. 1 indicate a serial interface and regulator plus power monitor circuitry.

As discussed so far, the arrangement of FIG. 1 is conventional in the art, which makes it unnecessary to provide a more detailed description herein. Also, while a single VCM is illustrated herein for simplicity, plural VCMs may be included in a hard disk drive HDD as illustrated herein.

At supply (e.g., 12V) power off (e.g., emergency power-off), a switch such as isolator field-effect transistor ISO_FET (FIG. 1, top) is immediately turned off by the controller 12 so as to isolate a VCV line/node coupled to the power supply from a line Vmotor intended to provide supply power to the spindle motor SM.

The controller 12, supplied by the Vmotor (voltage) line, has integrated therein a routine (e.g., SW-based) to implement both rectification of the back electromotive force (BEMF) of the spindle motor SM and parking of the HDD heads via the VCM.

Figure 2:
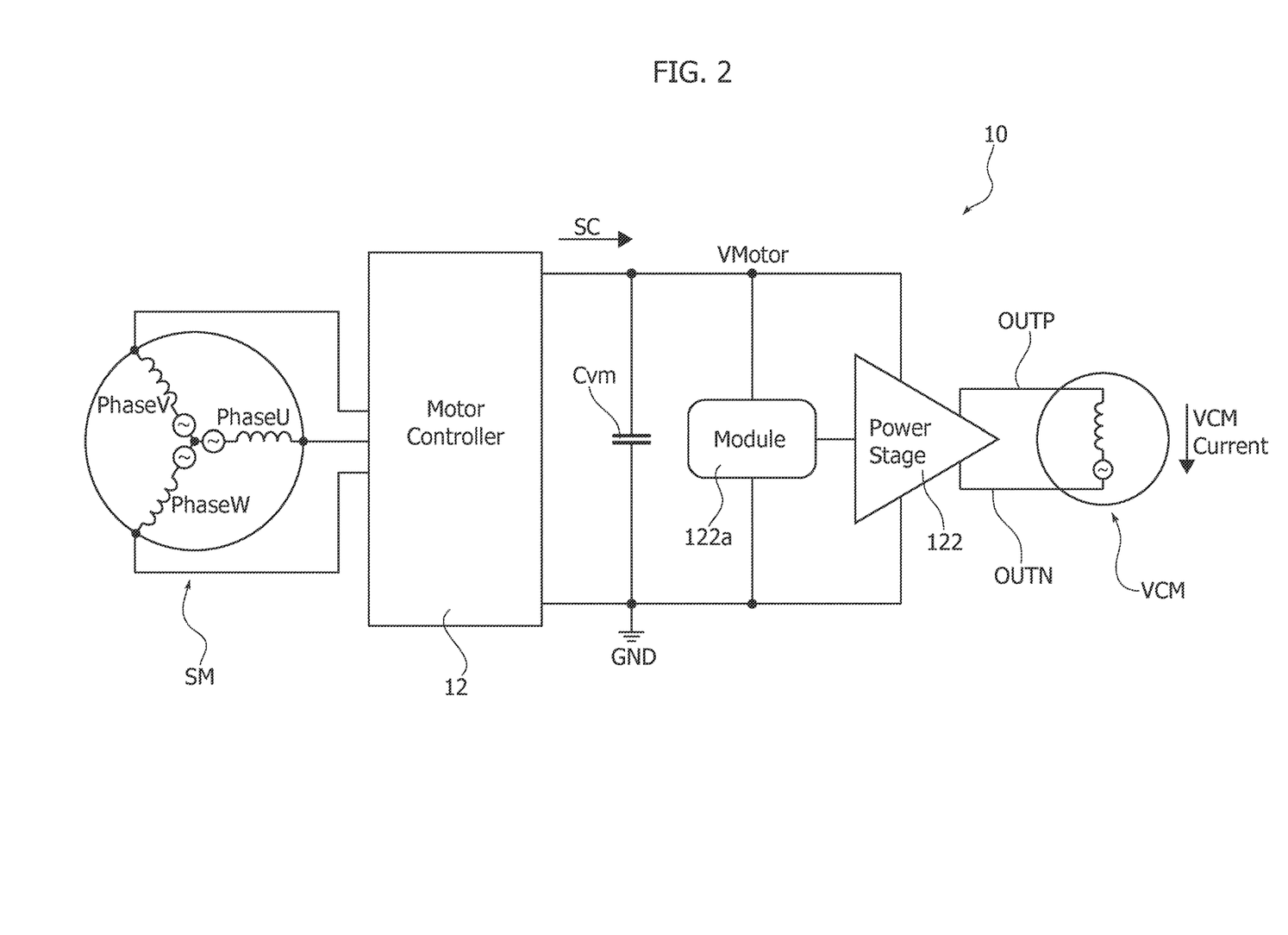
FIG. 2 is a simplified block diagram showing the situation of the circuitry of FIG. 1 at power off, namely when a head retract procedure is energized by rectifying the back electromotive force (BEMF) of the HDD spindle motor.

FIG. 2 is a simplified block diagram showing the situation at power off, where the head retract procedure is energized via rectification of the BEMF of the spindle motor SM. To that effect, the voltages across the windings ("phases" PhaseU, PhaseV, PhaseW in FIGS. 1 and 2) of the spindle motor SM are supplied to the controller 12. Based thereon, the controller 12 (which may include for that purpose, e.g., a synchronous step-up regulator module operating at 40 kHz with 60% duty-cycle) produces a (rectified) spindle current SC. This current is used to charge a capacitor Cvm coupled to a line Vmotor and referred to a reference node such as ground GND. The energy stored on the capacitor Cvm can thus be used to implement, via a VCM power stage 122 controlled via a module 122A (operating, e.g., at 1 kHz with 60% duty-cycle) a retract procedure for the VCM.

In order to control the VCM speed, the VCM power stage 122 is controlled in a discontinuous mode. The current through the VCM is periodically interrupted so to be able to "read" the VCM back electromotive force or BEMF generated by the motion thereof.

Figure 3:
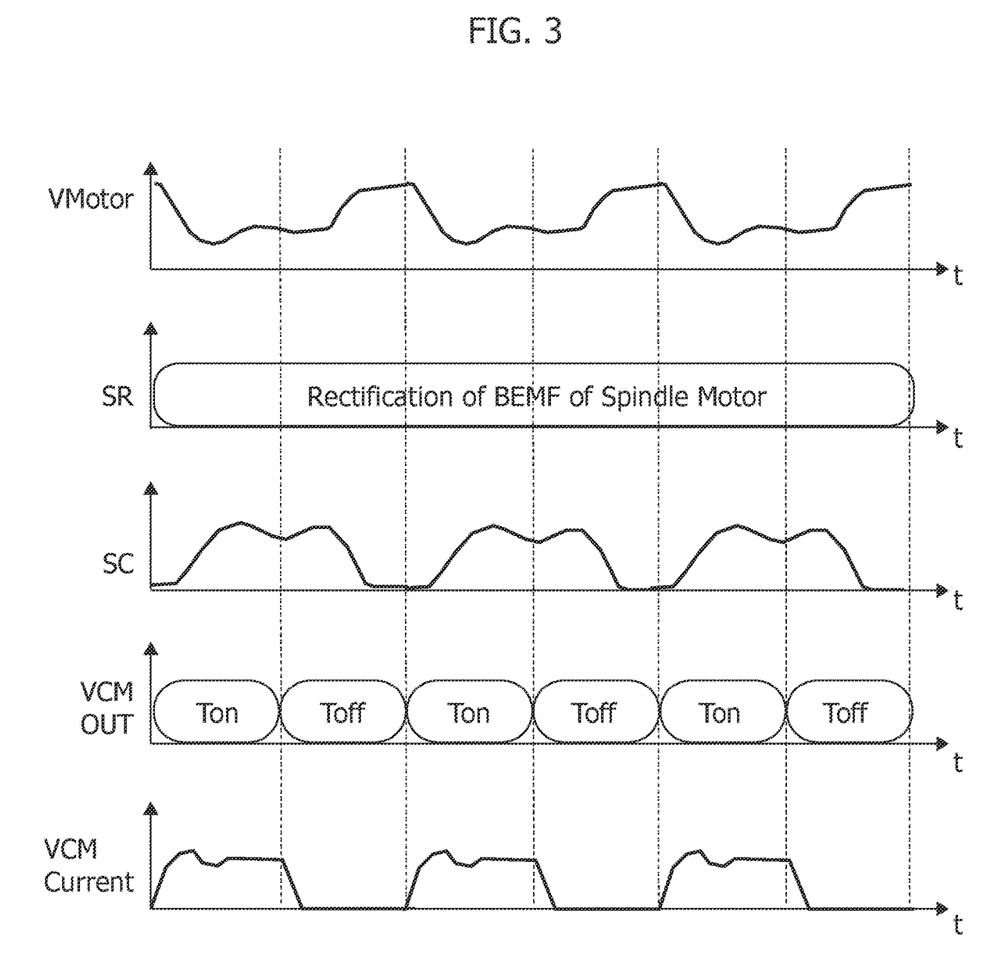
FIG. 3 comprises plural timing diagrams representing a possible behavior of voltages and currents in the case of an emergency retract with a VCM driven in a discontinuous mode.

This type of discontinuous operation is illustrated in FIG. 3. That figure reproduces a various time diagrams sharing a same (abscissa) time scale indicative of a possible time behavior of: the voltage over the line VMotor, the rectification action SR of the BEMF of the spindle motor SM, the spindle current SC, the differential VCM output (OUTP−OUTN) being alternately turned on (Ton) and off (Toff), and the current through the VCM.

It is noted that—in general terms—the average value of the current through the VCM is related to the duty-cycle selected for the discontinuous mode procedure. This action of controlling the duty-cycle (to a fixed value, e.g., 60%) can be performed by the controller 12 in a manner known to those of skill in the art. This does not represent an issue for speed control in normal operation. Conversely, if the VCM speed is desired to be slowed down (braked) quickly, the operating duty-cycle may act as a limiting factor of the braking capability.

Figure 4A:
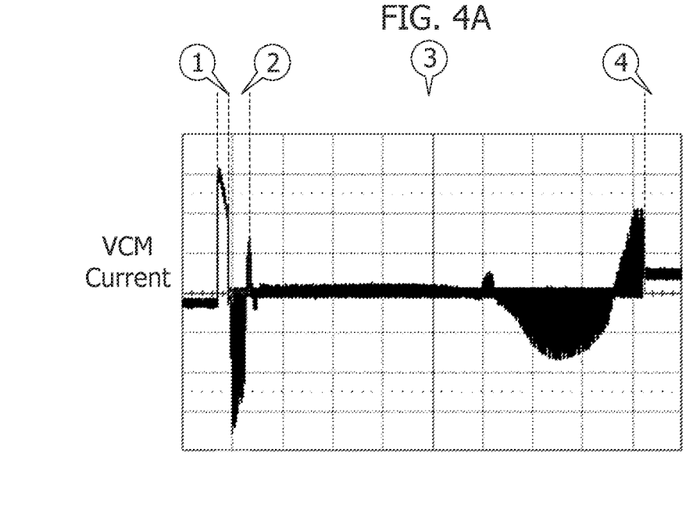
FIGS. 4A to 4C are illustrative of VCM signal profiles in head retract operation during braking time in a conventional arrangement.
Figure 4B:
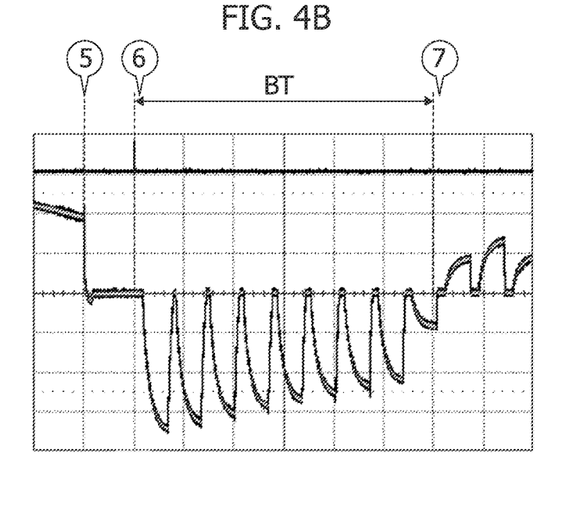

FIGS. 4A and 4B represent possible time behaviors for the current through the VCM during a head retract procedure at constant speed when a fast seek to the outer diameter (OD) direction has been commanded previously.

The area indicated as 1 is representative of a seek current profile: a high (positive) current, driven in the VCM, moves the heads with a (very) high speed in a ramp direction. The area indicated as 2 is representative of a VCM brake procedure: the current through the VCM is reversed to brake the VCM in a time that should be desirably as short as possible. The operating duty-cycle is limiting the maximum average current during brake time; this highlighted in the "zoomed" representation of FIGS. 4B, where the current through the VCM is—e.g., via the power stage 122—alternately turned "on" (that is, facilitated or allowed) and "off" (that is, countered or interrupted). The area indicated as 3 is representative of constant speed operation: the amplitude of the current through the VCM is regulated in order to keep the speed under control. The area indicated as 4 is representative of the end of the retract procedure: when the heads reach the park position, an end of travel procedure stops the VCM driving.

More specifically, the behavior before point 4 in FIG. 4A represents a current increase programmed in the speed control to allow for the fact that the VCM may have reached its park position while the speed controller is not already "aware" that the park routine is to be terminated. The controller thus tries to keep the speed under control increasing the driven VCM speed until an End Of Travel feature informs the controller that the park procedure is to be terminated.

The "zoomed" representation of the current through the VCM in FIG. 4B highlights the VCM braking time BT (between the points indicated as 6 and 7). The interval between the points indicates as 5 and 6 is a high impedance (Hi-Z) period represented merely by way of example to show a high BEMF generated by the VCM at the end of the seek time; in normal applications this Hi-Z period of time may not be required and will not be used.

The portion of FIG. 4B after point 7 shows the current increase programmed by the speed control in order to take into account the fact that the VCM has been slowed down during the braking phase and is expected to enter a constant speed control phase at a programmed speed. During the VCM braking phase the current is reversed to reduce (rapidly) the VCM speed—from point 6 to point 7 in FIG. 4B—in order to be able to provide a current (amplitude and polarity) adequate to maintain a regulated VCM speed during the rest of the retract procedure.

The lower diagram in FIG. 4B shows a possible time behavior of the current in the VCM during the driving in discontinuous mode. During the "off" (Toff) phase, the current is zeroed to carry out the measurement of the back electromotive force (BEMF) voltage across the VCM. During the Toff phase, the current takes a certain time to discharge to zero.

Figure 4C:
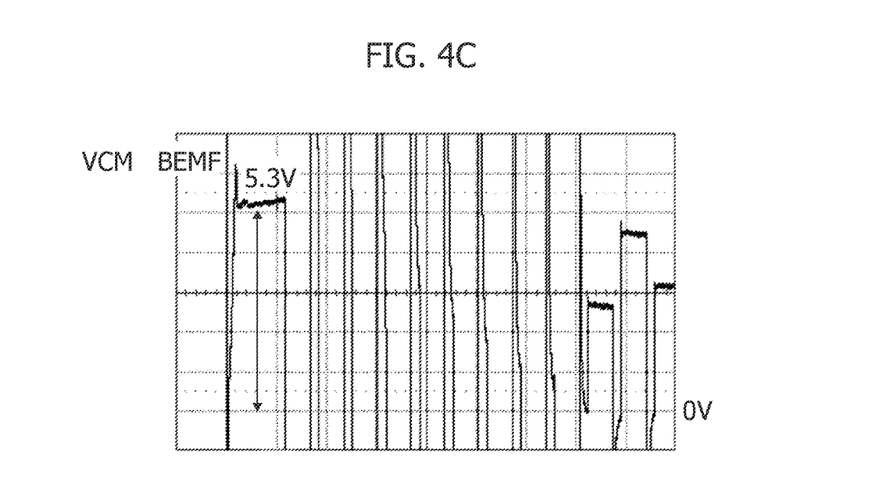

The diagram in FIG. 4C shows a possible time behavior of the differential voltage across the VCM when driven in a discontinuous mode. The voltage scale in FIG. 4C (e.g., 1V/div) highlights the amplitude of the BEMF generated by the VCM when it is sampled at the end of the "off" (Toff) phase. Due to the scale used, during the "on" (Ton) phase the differential voltage across the VCM goes out of scale and is not represented in its entirety. Combining the points of the VCM differential voltage value at the end of the Toff phases makes it possible to graphically represent the trend of the VCM speed deceleration during the speed recovery phase, e.g., following a fast seek.

Operation as represented in FIGS. 4A to 4C can be regarded as otherwise conventional in the art. The "zoomed" representations of the current through the VCM in FIG. 4B highlight the VCM braking time BT (between the points indicated as 6 and 7). The interval between the points indicates as 5 and 6 is a high impedance (Hi-Z) period represented merely by way of example to show a high BEMF generated by the VCM at the end of the seek time; in normal applications this Hi-Z period of time may not be required and will not be used.

In operation as represented in FIG. 4A to 4C, the duty-cycle is fixed during the VCM brake time. An almost constant speed reduction (deceleration) takes place from the maximum VCM speed to zero (or to a controlled VCM speed for retract).

Figure 5A:
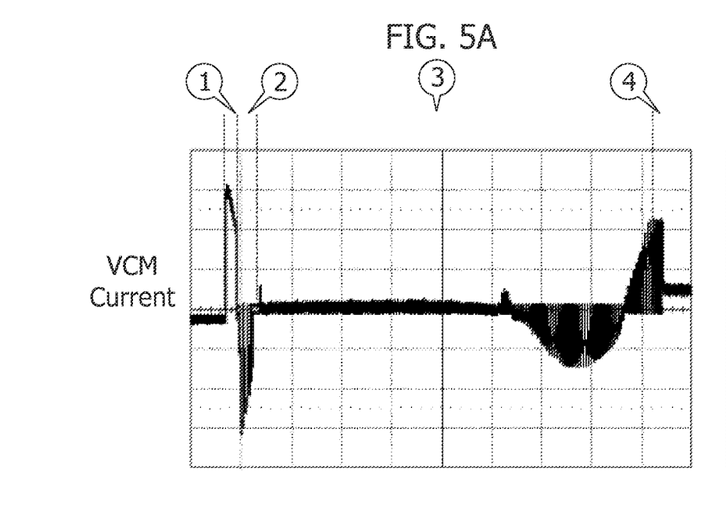
FIGS. 5A to 5C are illustrative of VCM signal profiles in head retract operation during braking time in head retract operation in a first example presented herein.
Figure 5B:
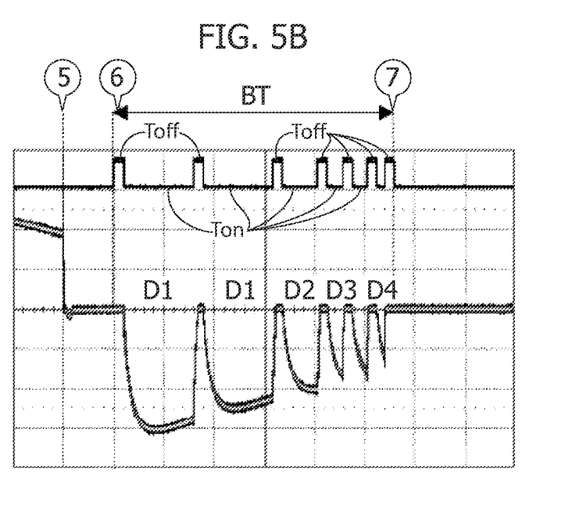
Figure 5C:
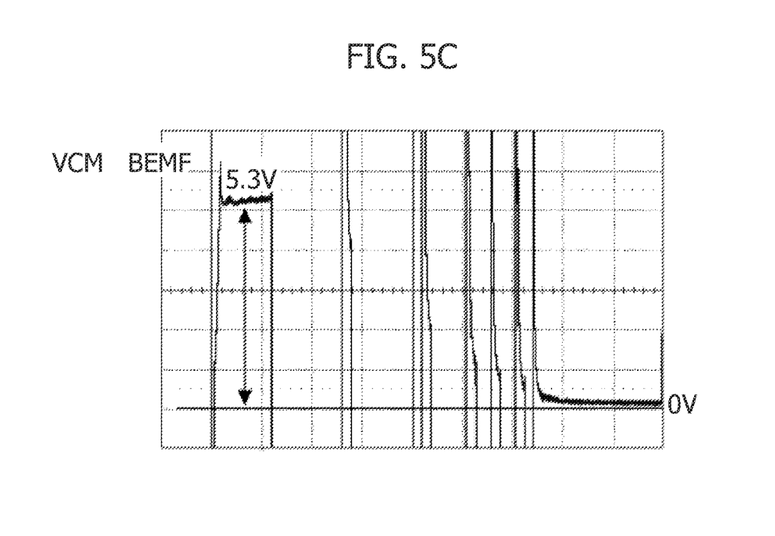

FIGS. 5A to 5C represent by way of direct comparison with FIGS. 4A to 4C, respectively, signal profiles during a head retract procedure according to the proposed solution. This example again refers to a case where a fast seek to the OD direction has been commanded first. Here again, the area labeled 1 refers to a seek current profile where a high positive current, driven in the VCM, moves the heads with a (very) high speed in the ramp direction.

The area labeled 2 is again representative of a VCM brake procedure: VCM current is reversed so to brake the VCM in shorter time as possible. Here again, the operating duty-cycle sets a limit on the maximum average current, but in this case the duty-cycle is variable (that is, from an upper value D1 to D1>D2>D3>D4 with a decreasing duration of the "on" time). This action of controlling the duty-cycle (to a variable value, e.g., D1>D2>D3>D4) can be controlled by the controller 12 (e.g., via the power stage and module 122, 122A in FIG. 2) in a manner known to those of skill in the art as a function of the detected VCM speed (see FIGS. 6A, 6B in the following). This may be, e.g., via a look up table (LUT) having stored therein values for the duty cycle to be applied as a function of the VCM speed (V1>V2>V3>V4).

The area labeled 3 in FIG. 5A is again representative of constant speed operation: the current through the VCM is regulated so to keep the speed under control. The area 4 in FIG. 5A is again representative of the end of the retract procedure: when the heads arrive at the parking position an end of travel procedure in the controller 12 stops VCM driving.

The zoomed representation of the current through the VCM in FIG. 5B highlights a decreased VCM braking time in comparison with the conventional approach represented in FIGS. 4A to 4C.

The upper diagram in FIG. 5B it thus the digital signal that defines the "on" (Ton) phase and the "off" (Toff) phases of driving the VCM: when the logic level is high (Toff), the power stage 122 is driven at high impedance, while when the logic level is low (Ton) the power stage 122 controls the current driven in the VCM.

FIG. 5B shows that, in examples as presented herein, during the VCM brake time the operating duty-cycle is modulated via the controller 12 and made a function (proportional) to the VCM speed: the higher the VCM speed the higher the operating duty-cycle Ton/(Ton+Toff) applied for braking, e.g., with a monotonic relationship of decreasing values of the duty-cycle DC to decreasing values of the sensed VCM speed (VCMspeed). In this figure, one can see that, the "on" phase (Ton) phase is variable and proportional to the speed, while the "off" phase (Toff) phase is of constant duration.

The diagram in FIG. 5C shows a possible time behavior of the differential voltage across the VCM when driven in a discontinuous mode with a variable duty-cycle. Such an approach facilitates obtaining an at least approximately exponential speed deceleration starting from a maximum VCM speed to zero (or to a controlled VCM speed) for retract, which results in the ability to slow down the VCM speed in a shorter time in comparison with a conventional "constant duty-cycle" approach.

Figure 6A:
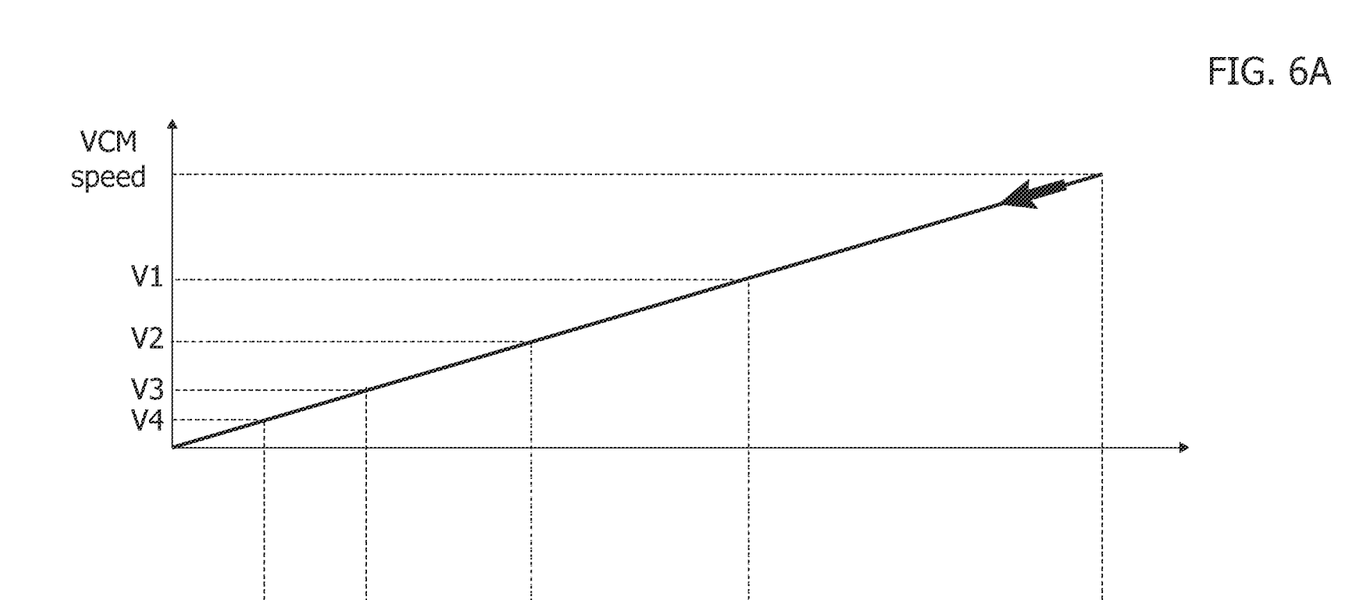
FIGS. 6A and 6B show a possible relationship between a detected VCM speed and a braking duty-cycle applied to the VCM according to a first example presented herein.
Figure 6B:
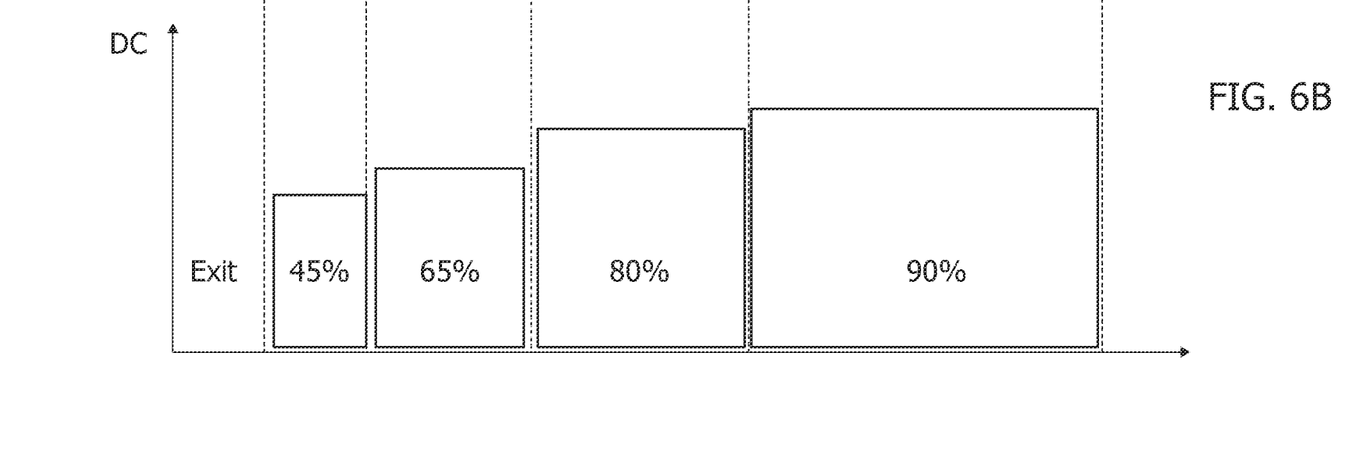

FIGS. 6A and 6B are exemplary of the implementation of a VCM braking procedure based on the solution proposed herein, according to a first embodiment. Specifically, the diagram of FIG. 6A is exemplary of possible values V1, V2, V3, V4 of the VCM speed that can be applied to a VCM, e.g., during a (fast) seek phase. These values can be sensed—e.g. in any conventional manner known to those of skill in the art—so that during a VCM brake phase following a fast seek phase, the controller 12 can control the duty-cycle DC by setting the duty-cycle DC variably (that is, "modulating" the duty-cycle DC) as a function of to the detected VCM speed as exemplified by the diagram of FIG. 6B (e.g. 90% for a speed in excess of V1, 80% for a speed between V1 and V2, 65% for a speed between V2 and V3, 45% for a speed between V3 and V4, and so on).

To summarize, when the speed is high (e.g., V1 in FIG. 6A), the duty-cycle Ton/(Ton+Toff) is higher (e.g., 90% in FIG. 6B): more braking current is driven through the VCM so to have faster deceleration. When the speed is low (e.g., V4 in FIG. 6B) the duty-cycle is lower (e.g., 45% in FIG. 6B), a gentler deceleration facilitates entering the speed regulation phase (area labeled 3 in FIG. 5A).

Such a monotonic relationship of decreasing values of the duty-cycle DC (e.g., FIG. 6B) to decreasing values of the sensed VCM speed (e.g., FIG. 6A) can be stored in a look-up table (LUT) associated to the controller 12.

In examples as considered herein, the sampling time of the back electromotive force (BEMF) of the spindle motor SM can be made no longer constant: e.g., this can be lower at high speed and higher at low speed. A lower sampling rate at high speed is advantageous in decreasing the VCM speed more extensively when the heads are still far from the ramp (or to the ID crash stop position). A higher sampling rate at a low speed is likewise advantageous insofar as this facilitates a smoother control in entering in speed regulation.

Figure 7A:
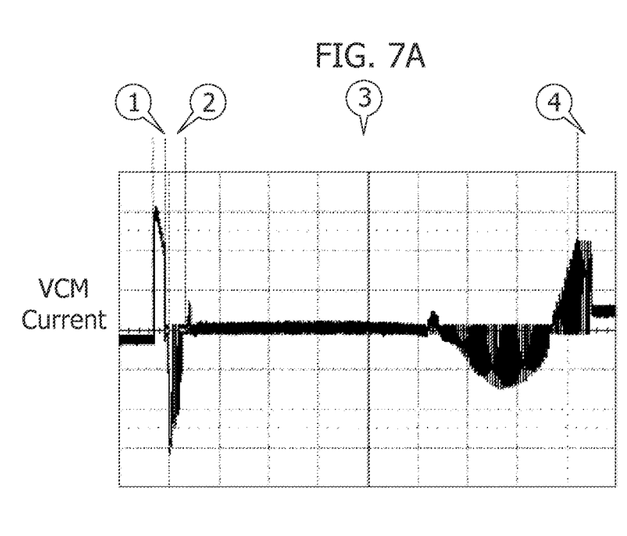
FIGS. 7A to 7C are illustrative of VCM signal profiles in head retract operation during braking time in a second example presented herein.
Figure 7B:
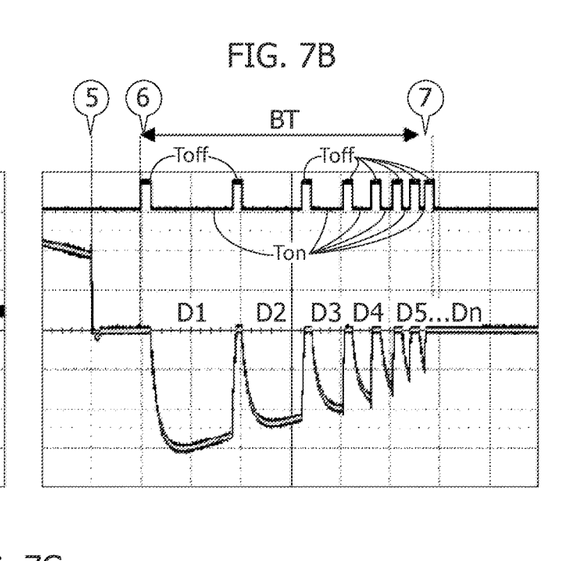
Figure 7C:
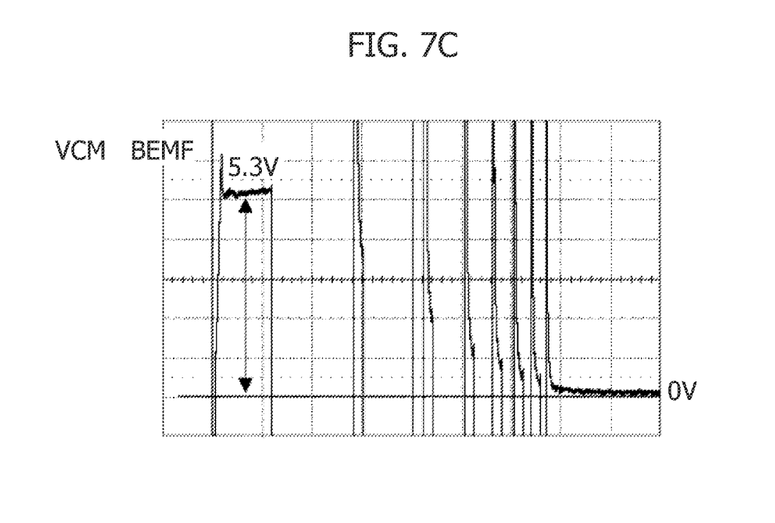

FIGS. 7A to 7C represent by way of direct comparison with FIGS. 4A to 4C and FIGS. 5A to 5C, respectively, signal profiles during a head retract procedure according to a possible variant of the proposed solution by again referring to an exemplary case where when a fast seek to the OD direction has been commanded first.

Again, the area labeled 1 in FIG. 7A is representative of a seek current profile where a VCM drives the heads to a (very) high speed in the ramp direction. The area labeled 2 in FIG. 7A is again representative of a VCM brake procedure: the current through the VCM is reversed so as to brake the VCM in as short a time as possible. Here again, the operating duty-cycle would set a limit to the maximum average current. The area labeled 3 in FIG. 7A is again representative of constant speed operation: the current through the VCM is modulated so to keep the speed under control. Finally, the area labeled 4 in FIG. 7A is representative of the end of the retract procedure.

The zoomed representations of the current through the VCM in FIG. 7B once more highlight a decreased VCM braking time in comparison with a conventional arrangement as represented by FIGS. 4A to 4C.

FIGS. 7A to 7C are illustrative of the fact that a "stepwise" variation/modulation of the duty-cycle (e.g., 90%, 80%, 65%, 45%—see FIG. 6B) is not mandatory in that a continuous variation/modulation as a function of the VCM speed is possible.

Figure 8A:
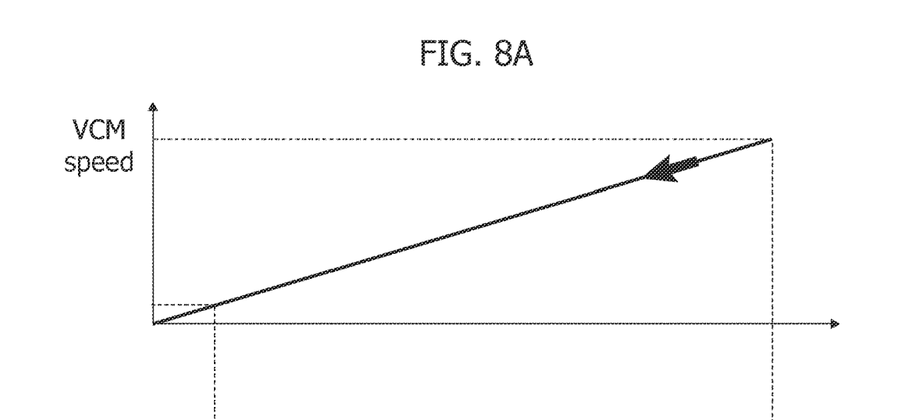
FIGS. 8A and 8B show a possible relationship between a detected VCM speed and a braking duty-cycle applied to the VCM according to a second example presented herein.
Figure 8B:
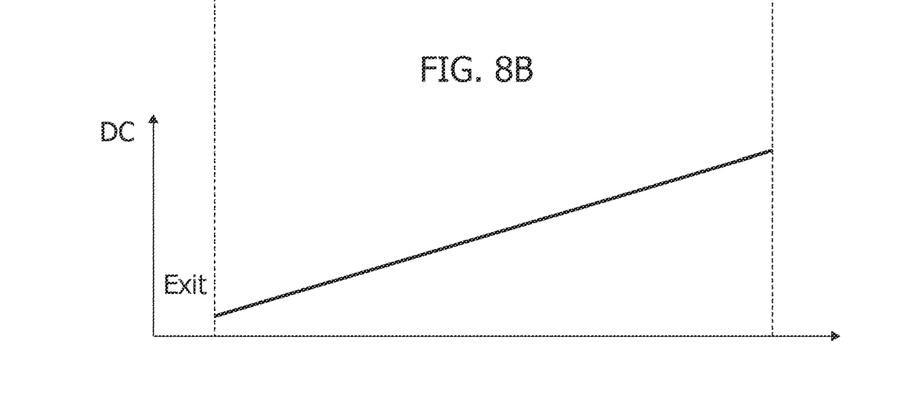

During the VCM brake time, the controller 12 can control the duty-cycle DC by varying the duty-cycle DC (that is, by "modulating" the duty-cycle DC) as a function of the detected VCM speed as exemplified by the diagram of FIGS. 8A and 8B, that is in a continuous (non-stepped) manner as a function (e.g., directly proportional to the VCM speed) based on a relationship such as:

$$DC\ (\%) = VCMspeed * Kv$$

where:
DC (%) is the duty-cycle Ton/(Ton+Toff) applied to the VCM during discontinuous mode operation,
VCMspeed is the real VCM detected speed, and
Kv is a constant coefficient (that may be selectable by the user).

Such a monotonic relationship of decreasing values of the duty-cycle DC (e.g., FIG. 8B) to decreasing values of the sensed VCM speed (e.g., FIG. 8A) lends itself to being calculated dynamically at each sampling of the actual VCM speed. For instance, at the end of (each) Toff phase where the BEMF of the VCM is detected, the controller 12 calculates a value for the duty-cycle DC to be applied in subsequent Ton phase. In that case, a look up table can be dispensed with insofar as the duty-cycle is computed each time as a function of the detected VCM speed.

Figure 9:
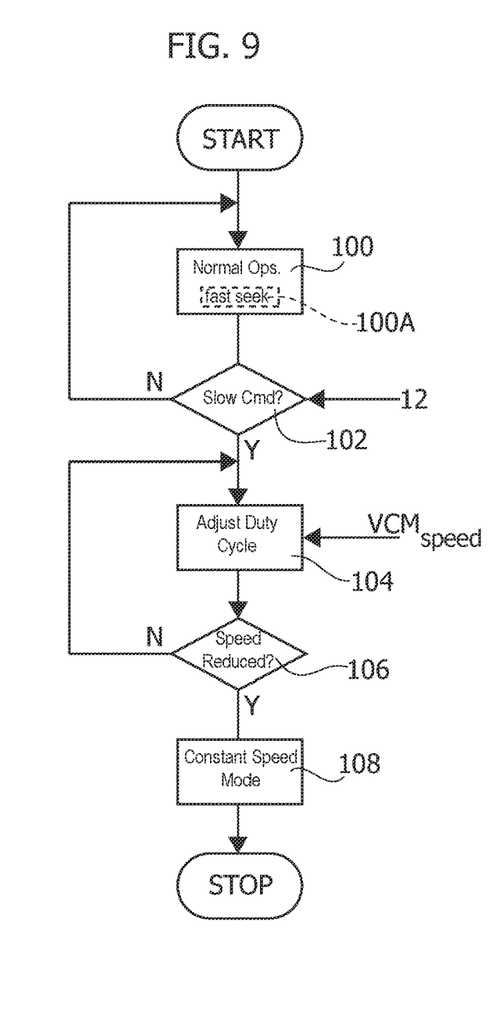
FIG. 9 is a flow chart exemplary of steps involved in implementing examples as presented herein.

The flow chart of FIG. 9 is exemplary of a possible sequence of steps in implementing the solution proposed herein. It will be otherwise appreciated that the sequence of steps of FIG. 9 is merely exemplary: one or more steps illustrated in FIG. 9 can be performed in a different manner (with other HW and/or SW tools, for instance) and/or replaced by other steps with additional steps possibly added.

The block 100 is exemplary of "normal" operation of a VCM in an HDD as otherwise conventional in the art. That kind of operation may include a fast seek command 100A (see the areas labeled 1 in FIGS. 4A, 5A and 7A). The block 102 is indicative of a check made as to whether a command to slow down the VCM by reducing the speed thereof, e.g., in view of a retract step, is received (e.g., from the controller 12).

If no such command is received (negative outcome, "N", of the block 102), normal operation is continued/resumed as exemplified by the block 100. A positive outcome, "Y" of the test of block 102 indicates that a command to slow down the VCM by reducing the speed thereof is received (e.g., from the controller 12). Such a command may follow a fast seek command 100A (see the areas labelled 1 in FIGS. 4A, 5A and 7A).

In that respect it will be appreciated that, while devised by paying specific attention to a command to slow down the VCM following a fast seek command, the examples presented herein are not strictly limited to that possible contingency. Examples as presented herein can in fact be applied advantageously whenever it is desired to slow down VCM speed to a safe level, e.g., before the VCM arms hit the parking ramp or the inner crash stop.

The block 102 in FIG. 9 is thus exemplary of receiving (e.g., from and/or at the controller 12) a command to slow down the speed of a voice coil motor, VCM in a hard disk drive HDD. The block 104 is exemplary of the capability of example described herein—once a "slow-down" command is received (positive outcome, "Y" of the block 102)—of self-adjusting the operating duty-cycle DC, namely, Ton/(Ton+Toff) in FIGS. 5B and 7B, based on the actual speed of the VCM (VCMspeed). The block 104 is thus exemplary of the VCM being operated—in response to the slow down command received at 102—in a discontinuous mode by switching on and off (e.g., via the module 122) the current through the VCM with a duty-cycle wherein operating the VCM in a discontinuous mode leads to a reduction of the speed VCMspeed of the VCM.

The block 104 is also exemplary of sensing (e.g., at the controller 12) the speed VCMspeed of the VCM operated in the discontinuous mode, and varying the duty-cycle of switching on and off the current through the VCM as a function of the sensed speed of the VCM operated in the discontinuous mode. The duty-cycle Ton/(Ton+Toff) can thus be reduced in response to a reduction of the sensed VCM speed.

As discussed in the introductory portion of the description (and as otherwise conventional in the art) during the slow down phase (areas indicated as 2 in FIGS. 5A and 7A and portions between the points 6 and 7 in the zoomed representations of FIGS. 5B and 7B) the controller 12 periodically switches the current through the VCM alternately "on" and "off" so that the current through the VCM is interrupted during the "off" times and the VCM BEMF generated by the (residual) motion of VCM (and thus the speed VCMspeed) can be "read".

In conventional arrangements (see the area indicated as 2 in FIG. 4A and portion between the points 6 and 7 in the zoomed representations of FIG. 4B) this "on-off" (that is PWM) action takes place with a constant duty-cycle (ratio of the "on" time to the sum of the "on" and "off" times).

In arrangements as presented herein (areas indicated as 2 in FIGS. 5A and 7A and portion between the points 6 and 7 in the zoomed representations of FIGS. 5B and 7B) this "on-off" (that is, PWM) action takes place with a duty-cycle Ton/(Ton+Toff) that is varied as a function of the detected VCM speed, wherein the duty-cycle DC is reduced in response to a reduction of the sensed VCM speed, e.g. according to a monotonic relationship of decreasing values of the duty-cycle DC to decreasing values of the sensed VCM speed.

As discussed, this may occur either by way of a step-like adjustment (as exemplified in FIG. 6B, e.g., by the controller 12 reading duty-cycle values from a LUT) or by way of a continuous adjustment (as exemplified in FIG. 8B, e.g., via a relationship DC (%)=VCMspeed*Kv implemented by the controller 12).

Whatever the option adopted, the arrangements presented establish a (monotonic) relationship of decreasing values of the duty-cycle DC to decreasing values of the sensed VCM speed so that the higher the speed, the higher the duty-cycle applied (see, e.g., FIGS. 6A-6B and 8A-8B).

However implemented, the arrangements presented herein facilitate fast slowing down of the VCM speed as exemplified by block 104 until a check in a step 106 indicates (positive outcome, "Y" in block 106) that the VCM speed has been ultimately reduced as desired in order to facilitate entering a constant speed drive phase 108 (see the label "Exit" in FIGS. 6B and 8B and the speed regulation phases indicated as 3 in FIGS. 5A and 7A) until the end of the retract procedure (areas indicated as 4 in FIGS. 5A and 7A): when the heads reach the park position an end of travel procedure stops VCM driving.

That is, in the arrangements presented herein, the speed of the voice coil motor, VCM can be reduced to a valley value (for starting the controlled operation represented by the areas 3 in FIGS. 5A and 7A) and, in response to the speed of the VCM being reduced to the valley value (check of block 106 in FIG. 9), the VCM is operated in a constant speed mode 108.

Operation as presented herein (see, e.g., FIGS. 5A-5C, 6A-6B, 7A-7C, 8A-8B and 9) results in a higher braking capability, with an ensuing double advantage: HDD reliability is improved and the maximum seek time in a possible previous fast seek phase can be increased in comparison with conventional arrangements.

As discussed, during head retract in an HDD, VCM speed regulation, both at power ON and at power OFF, is currently performed with a PWM discontinuous mode technique. Before entering a speed regulation phase (e.g., in case of a fast seek was performed just before the heads retract) a brake procedure is started in order to slow down the VCM (reducing its speed quickly) and prevent it to hit the ramp or the inner crash stop at a speed higher than the value tolerated for HDD reliability.

In conventional solutions, with fixed duty-cycle operation in a discontinuous mode, the user has to take into account, e.g., a constraint on maximum seek speed resulting from a reduced brake capability, which in turn translates into a lower HDD transfer data rate.

In solutions as discussed herein, during the braking phase the PWM duty-cycle applies during the discontinuous mode procedure is automatically adjusted based on the detected VCM speed: the higher the speed, the higher the duty-cycle applied (see, e.g., FIGS. 6A-6B and 8A-8B). In that way a higher resulting (average) current is driven through the VCM to produce (based on a monotonic relationship: see, again, FIGS. 6A-6B and 8A-8B) a stronger deceleration when the speed is high, reducing the speed more quickly.

Without prejudice to the underlying principles, the details and embodiments may vary, even significantly, with respect to what has been described in the foregoing, by way of example only, without departing from the extent of protection.

What is claimed is:

1. A method, comprising:
   receiving a slow down command to slow down a speed of a voice coil motor (VCM) in a hard disk drive;
   in response to receiving the slow down command, operating the VCM in a discontinuous mode by switching on and off a current through the VCM with a duty-cycle, wherein operating the VCM in the discontinuous mode reduces the speed of the VCM;
   sensing the speed of the VCM while operating the VCM in the discontinuous mode; and
   varying the duty-cycle of the switching on and off the current through the VCM as a function of the sensed speed of the VCM operated in the discontinuous mode, wherein varying the duty-cycle comprises reducing the duty-cycle in response to a reduction of the sensed VCM speed.

2. The method of claim 1, wherein varying the duty-cycle of the switching on and off the current through the VCM as the function of the sensed speed of the VCM operated in the discontinuous mode comprises reducing the duty-cycle in response to the reduction of the sensed VCM speed in a step-wise manner.

3. The method of claim 1, wherein varying the duty-cycle of the switching on and off the current through the VCM as the function of the sensed speed of the VCM operated in the discontinuous mode comprises setting the duty-cycle according to DC (%)=VCMspeed*Kv, where DC (%) is the duty-cycle applied to the VCM during discontinuous mode operation, VCMspeed is the sensed speed of the VCM operated in the discontinuous mode, and Kv is a proportionality coefficient.

4. The method of claim 3, wherein the proportionality coefficient is an adjustable coefficient.

5. The method of claim 1, further comprising receiving a fast seek command to increase the speed of the VCM prior to receiving the slow down command.

6. The method of claim 1, further comprising:
slowing down the speed of the VCM to a valley value; and
in response to the speed of the VCM being reduced to the valley value, operating the VCM in a constant speed mode.

7. A controller for a voice coil motor (VCM) in a hard disk drive, the controller configured to:
in response to a received slow down command, operate the VCM in a discontinuous mode by switching on and off a current through the VCM with a duty-cycle, wherein operating the VCM in the discontinuous mode reduces a speed of the VCM;
sense the speed of the VCM operated in the discontinuous mode; and
vary the duty-cycle of the switching on and off the current through the VCM as a function of the sensed speed of the VCM operated in the discontinuous mode, wherein the duty-cycle is reduced in response to a reduction of the sensed VCM speed.

8. The controller of claim 7, wherein the controller is configured to vary the duty-cycle of the switching on and off the current through the VCM as the function of the sensed speed of the VCM operated in the discontinuous mode by reducing the duty-cycle in response to the reduction of the sensed VCM speed in a step-wise manner.

9. The controller of claim 7, wherein the controller is configured to vary the duty-cycle of the switching on and off the current through the VCM as the function of the sensed speed of the VCM operated in the discontinuous mode by setting the duty-cycle as DC(%)=VCMspeed*Kv, where DC (%) is the duty-cycle applied to the VCM during discontinuous mode operation, VCMspeed is the sensed speed of the VCM operated in the discontinuous mode, and Kv is a proportionality coefficient.

10. The controller of claim 9, wherein the proportionality coefficient is an adjustable coefficient.

11. The controller of claim 7, wherein the controller is configured to:
slow down the speed of the VCM to a valley value; and
operate the VCM in a constant speed mode in response to the speed of the VCM being reduced to the valley value.

12. The controller of claim 7, wherein a monotonic relationship of decreasing values of the duty-cycle to decreasing values of the sensed VCM speed is stored on the controller.

13. A hard disk drive system, comprising:
the controller according to claim 7; and
at least one VCM coupled to the controller.

14. A processing device comprising the hard disk drive of claim 13.

15. The controller of claim 7, wherein the duty-cycle is reduced in response to the reduction of the sensed VCM speed during a VCM break phase following a VCM fast seek phase.

16. The controller of claim 7, wherein the current through the VCM is reversed during the discontinuous mode with respect to the current through the VCM during a seek phase.

17. The method of claim 1, wherein the current through the VCM is reversed during the discontinuous mode with respect to the current through the VCM during a seek phase.

18. A method of operating a voice coil motor (VCM) of a hard disk drive, the method comprising:
operating the hard disk drive in a discontinuous mode in response to receiving a slow down command, operating the hard disk drive in the discontinuous mode comprising:
supplying current pulses to the VCM according to a first duty cycle in the discontinuous mode of the hard disk drive,
sensing a speed of the VCM during the discontinuous mode, and
reducing the first duty cycle in response to a reduction in the sensed speed of the VCM.

19. The method of claim 18, wherein sensing the speed of the VCM comprises measuring a back electromotive force (BEMF) voltage across the VCM in between the current pulses.

20. The method of claim 18, wherein reducing the first duty cycle in response to the reduction in the sensed speed of the VCM comprises reducing the first duty cycle in a continuous manner.

21. The method of claim 18, wherein reducing the first duty cycle in response to the reduction in the sensed speed of the VCM comprises reducing the first duty cycle in a step-wise manner using a look up table.

22. The method of claim 18, wherein reducing the first duty cycle in response to the reduction in the sensed speed of the VCM is performed during a VCM break phase following a VCM fast seek phase.

23. The method of claim 18, wherein a polarity of the current pulses to the VCM during the discontinuous mode is reversed with respect to current provided to the VCM during a seek phase.

* * * * *